United States Patent [19]

Magenheimer et al.

[11] Patent Number: 5,495,063
[45] Date of Patent: Feb. 27, 1996

[54] PROCESS FOR ENVIRONMENTALLY SAFE DESTRUCTION OF PYROTECHNIC MATERIAL

[75] Inventors: Hans E. Magenheimer, Badenweiler; Roland Traute, Staufen; Wolfgang Simon, Muelheim, all of Germany

[73] Assignee: Buck Werke GmbH & Co., Bad Überkingen, Germany

[21] Appl. No.: 83,379

[22] Filed: Jun. 28, 1993

[30] Foreign Application Priority Data

Jun. 29, 1992 [DE] Germany .................. 42 21 343.6

[51] Int. Cl.⁶ .......................................... A62D 3/00
[52] U.S. Cl. .................. 588/202; 110/237; 110/344; 110/345
[58] Field of Search ................. 588/202, 244; 110/344, 345, 237

[56] References Cited

U.S. PATENT DOCUMENTS

| | | | |
|---|---|---|---|
| 3,848,548 | 11/1974 | Bolejack, Jr. et al. | 588/203 |
| 3,903,814 | 9/1975 | Altekruse | 110/237 |
| 3,916,805 | 11/1975 | Kalfadelis et al. | 110/345 |
| 5,129,903 | 1/1993 | Abboud et al. | 110/34.5 |
| 5,207,176 | 5/1993 | Morhard et al. | 110/246 |
| 5,331,106 | 7/1994 | Spas | 588/202 |

FOREIGN PATENT DOCUMENTS

| | | | |
|---|---|---|---|
| 4106615 | 10/1991 | Germany | A62D 3/100 |
| 4037919 | 5/1992 | Germany | F42D 5/04 |

*Primary Examiner*—Ngoclan Mai
*Attorney, Agent, or Firm*—Darby & Darby

[57] ABSTRACT

In order to work up pyrotechnical material, I. the pyrotechnical material is burned in a controlled manner, the slag is optionally allowed to continue reacting and the crude gas formed is passed through a high-temperature region in which the gas is exposed to a temperature of at least 1200° C. over a predetermined period in order to decompose organic substances still present; II. the crude gas formed during the combustion is cooled to a temperature below 400° C.; III. the crude gas is purified under dry conditions by first feeding it into a preliminary separator, coarse particles being separated off, and then feeding the crude gas via fine dust filters in order to separate off finely divided solids and/or IV. the crude gas is optionally purified under wet conditions by first passing it through a rotary scrubber and then passing it via one or more absorption units and V. the purified gas is released as waste air.

13 Claims, 2 Drawing Sheets

PROCESS FOR ENVIRONMENTALLY SAFE DESTRUCTION OF PYROTECHNIC MATERIAL

The invention relates to a process for working up pyrotechnical material and an apparatus suitable for this purpose.

Pyrotechnical munitions, such as illumination elements, flares, propellant charges, for example for rockets, which are no longer suitable for use owing to the expiry of their shelf life, must be disposed of. Owing to the pyrotechnical potential and the high strength of the active material, safe mechanical separation of the active materials is impossible or is possible only at a disproportionately high expense.

Illumination elements consist, as a rule, of a container, which is usually made of metal, preferably of aluminium, a fuse and the active material. The active material is composed of a light metal powder as an energy source, an oxidising agent which can eliminate oxygen, an organic binder for mechanical strengthening of the mixture and optionally colour intensifiers. As a rule, magnesium is used as the light metal powder since other suitable metals are either toxicologically unsafe or too expensive. As a rule, nitrates, in particular sodium nitrate, are used as oxidising agents, chlorates or perchlorates also being used in exceptional cases. Polymers are used as organic binders. Halogen-containing compounds, in particular fluorine-containing or chlorine-containing metal salts, are present as colour intensifiers. When the illumination elements burn, predominantly metal oxides, such as magnesium oxide, sodium oxide and aluminium oxide, nitrogen and oxides of nitrogen and carbon oxides and optionally hydrogen halide are therefore formed. Propellant charges consist essentially of nitrogen cellulose.

DE-B 41 06 615 discloses a process for working up smoke elements or smoke active materials containing chlorinated hydrocarbons. These active materials are processed in such a way that the zinc and aluminium compounds contained therein can be recovered and reused. This process relates to special working up steps for the chlorinated hydrocarbons contained in the active materials. Furthermore, DE-A 40 37 919 discloses a process for disposing of propellant charges from munitions, in which the propellant charges are comminuted with the addition of water and then burned using a special fluidised-bed furnace.

It is the object of the invention to provide a process by means of which pyrotechnical material, in particular illumination elements and propellant charges, can be disposed of, which can be carried out safely and in which no harmful substances are conveyed into the environment.

This object is achieved by a process for working up pyrotechnical material, which is characterised in that I. the pyrotechnical material is burned in a controlled manner, the slag is optionally allowed to continue reacting and the crude gas formed is passed through a high-temperature region in which the gas is at a temperature of at least 1200° C. over a predetermined period in order to decompose organic substances still present;

II. the crude gas formed during the combustion is cooled to a temperature below 400° C.;

III. the crude gas is purified under dry conditions by first feeding it into a preliminary separator, coarse particles being separated off, and then feeding it via fine dust filters in order to separate off finely divided solids, and/or IV. the crude gas is purified under wet conditions by first passing it through a rotary scrubber and feeding it via one or more absorption units, and V. the pure gas is released as waste air.

The process according to the invention makes it possible continuously to work up pyrotechnical material, no harmful substances passing to the outside and it being possible for reusable substances to be recovered and for the resulting heat to be utilised in a useful manner. For the purposes of the invention, pyrotechnical material is understood as meaning pyrotechnical articles and/or pyrotechnical charges.

In the first stage of the process according to the invention, the pyrotechnical material is burned in a controlled manner. Combustion may take place continuously or batchwise, in the continuous procedure the material supplied preferably being ignited in each case by the material already present in the reactor, whereas in the batchwise process a batch is always burned and thereafter the next batch is fed in and ignited. The throughput and residence time are dependent on the material to be burned, the type of process and the reactor used. In general, the residence time is in the range from 10 seconds to 1 minute.

Combustion is effected in one or more combustion chambers. The combustion chamber used is a reactor which can withstand the high temperatures generated during the combustion and can be loaded in a suitable manner. Either a tube reactor or a reactor having a brick lining is preferably used. A vertically arranged apparatus which consists of steel resistant to high temperatures and is cooled internally with gas is preferably used as the tube reactor. For this purpose, air is introduced via tangential nozzles and is passed over tangential plates in such a way that it flows along the wall of the tube reactor and hence cools the steel jacket. This ensures that the reactor jacket is at a temperature of no more than 400° C., which it withstands without damage. By feeding the air via tangential nozzles, the high temperature zone is limited in a defined manner to a certain region. This ensures on the one hand that organic pollutants are virtually completely degraded directly on formation by the combustion of the pyrotechnical elements and, on the other hand, that caking of material or abrasion at the internal wall is prevented.

In another embodiment, a reactor having a brick lining is used. This reactor constitutes a closed pressure-tight space which is lined on the inside with refractory material and is preferably a trough reactor or rotary kiln. Since the refractory material withstands temperatures of from above 1500° to 2000° C., it need not be cooled. In a preferred embodiment of the reactor having a brick lining, a mobile trough which receives melting material and falling slag and can be emptied batchwise is provided below the combustion chamber.

One or more identical or different reactors can be simultaneously used for the process according to the invention. A tube reactor is preferably used for working up pyrotechnical material where predominantly alkaline compounds escape into the crude gas, whereas a trough reactor is used for working up pyrotechnical material which releases predominantly acidic vapours.

After the controlled combustion of the pyrotechnical material, the crude gas formed is passed through a high-temperature region in which it is kept at a temperature of at least 1200° C. over a predetermined period in order to decompose any organic substances still present. If the crude gas has reached a temperature of over 1200° C. as a result of combustion, it is sufficient to keep the crude gas in the reaction region over the predetermined period without additional heating. In an embodiment, this is effected, for example, by ensuring that the reactor has a sufficient height so that the residence time of the ascending crude gas is sufficient for complete reaction in the high-temperature region. In another embodiment, in which the air is blown in tangentially, the crude gas (reaction gas) is passed spirally upwards and thus remains for a sufficiently long time in the high-temperature region. If the crude gas is not hot enough, an external heating source is provided in order to heat the crude gas to the desired temperature. The period of subsequent heating depends on the proportion of organic compounds and can be easily determined by one skilled in the art. As a rule, a period of 2 to 10 seconds is sufficient. A temperature of at least 1200° C., preferably at least 1500° C., is required in order to decompose the organic compounds.

The crude gas which leaves the high-temperature region contains virtually only inorganic compounds, which are partly in gaseous form and partly in the form of very small particles. Depending on the composition of the crude gas, dry purification and/or wet purification are carried out. The wet purification can be carried out before or after the dry purification. Preferably, the crude gas is first purified under dry conditions and then optionally subjected to a wet purification, depending on requirements. Since the gas which emerges from the high-temperature region has a very high temperature, it is cooled to a temperature of below 400° C., the heat simultaneously being used. In various applications, cold air can be mixed with the hot gas in the process for cooling. In addition, heat can be utilised by using known heat recovery techniques. An example of this is the connection to the heat circulation of a heating station. The crude gas is cooled to temperatures below 400° C. or, preferably, below 200° C., depending on the subsequent treatment.

The crude gas is purified under dry and/or wet conditions. For the dry purification, the gas should be cooled preferably to below 200° C. in order thus effectively to prevent de novo syntheses of organic pollutants. Furthermore, the filters usually used for the purification cannot as a rule withstand higher temperatures without damage.

For the dry separation, the crude gas is first fed into a preliminary separator in which coarse particles are separated off. Coarse particles are designated as particles which have a size of at least 10 µm. The separation of the coarse particles can be effected in a manner known per se. A multicyclone is preferably used for the separation. The type of particles separated off in the multicyclone is dependent on the pyrotechnical material worked up. If, for example, flare active materials or illumination elements are burnt, the coarse particles which are separated off in the multicyclone consist predominantly of magnesium oxide and/or aluminium oxide. The oxides separated off in the multicyclone can be reused.

The crude gas which has been freed from the coarse particles and has been sufficiently cooled by the pretreatment can then be fed via a fine dust filter to separate off small solid particles, i.e. particles having a diameter of less than 10 µm. Woven fabric filters are preferably used as fine dust filters. In a preferred embodiment, a system having several filters is used, one part of the filters being loaded simultaneously and the other part of the filters being cleaned to remove the deposited solids mixture. With the fine dust filters, the crude gas can be purified to a solids content of $\leq 10$ mg/m$^3$. The gas emerging from the fine dust filters is now at a temperature of about 100° C. and, if it no longer contains any gaseous impurities, can be released directly as waste air. If the gas still has gaseous impurities, in particular halogen-containing compounds or oxides of nitrogen, it is subjected to a wet purification after the dry purification. In the working up of flares and illumination elements, the gas is as a rule so pure that wet purification is no longer necessary.

Instead of the dry purification of the gas, wet purification can be carried out. This is useful if the gas contains predominantly gaseous impurities, such as halogen compounds and oxides of nitrogen, and a smaller amount of alkali metal and alkaline earth metal oxides. The wet purification may also be carried out before or, preferably, after the dry purification.

If the wet purification of the crude gas is carried out as a first purification step, the crude gas is preferably first cooled to a temperature of below 140° C. in a heat exchanger unit. The crude gas cooled in the heat exchanger or the crude gas purified under dry conditions is then passed into a scrubbing apparatus for scrubbing the crude gas. Apparatuses of this type are known to those skilled in the art. For scrubbing, the crude gas is preferably first fed through a Venturi unit in order to cool the gas to such an extent that its temperature is below the boiling point of water. It is then passed into a rotary scrubber. After the rotary scrubbing unit, gas scrubbing is carried out in a known manner using one or more absorption units. Packed or tray columns which are loaded with suitable wash liquids depending on the loading of the gas are preferably used for this purpose. Further filter units which are equipped, for example, with catalysts or carbon absorption filters may be connected to these columns if necessary. The very pure gas emerging from the absorption unit or units is removed as waste air.

To ensure that, during the entire process, no crude gas which has not been completely purified can escape into the environment, the entire plant is operated under reduced pressure. This is effected in a manner known per se, for example by using an extraction fan.

The process according to the invention can be adjusted in a variable manner to the conditions which arise during the combustion of different pyrotechnical materials. Thus, the individual stages of the process can be connected in series depending on requirements. If, for example, flare and illumination materials which form predominantly particulate oxides are burnt, the crude gas is preferably passed via preliminary separators and fine dust filters after cooling and is then sufficiently pure to be released into the environment. If pyrotechnical elements in which a high proportion of gaseous impurities are formed are worked up, the crude gas is preferably purified by scrubbing and passage through absorption units. If the gas furthermore contains solid components, it can be fed through preliminary separators and fine dust filters prior to scrubbing. In every case, the process is carried out in such a way that the gas contains only amounts of solids and gaseous compounds which are so small that it fulfils existing emission limits when released into the environment.

The invention furthermore relates to an apparatus for working up pyrotechnical material, which is characterised by (A) one or more reactor(s) for the controlled combustion of pyrotechnical material; (B) a heat exchanger unit for cooling the crude gas to a temperature of below 400° C.; (C) a preliminary separator for separating off coarse particles; (D) one or more fine dust filters; (E) a scrubbing apparatus for scrubbing the crude gas and (F) one or more absorption unit(s), the individual components (A) to (F) being capable of being connected to one another in any manner, depending on requirements.

Owing to the modular concept, the apparatus according to the invention is suitable for working up various types of pyrotechnical material, such as, for example, signal and illumination pyrotechnics, propellant charges, rocket propellant charges, smoke active materials and coloured smoke. Depending on the type and state of aggregation of the compounds formed during the controlled combustion, individual components or all components of the apparatus according to the invention can be connected to one another in succession. In a preferred embodiment, as is suitable in particular for working up signal and illumination pyrotechnics, the components (A), (B), (C) and (D) are connected in series. In another preferred embodiment, as is suitable in particular for working up smoke active materials, propellant charges and rocket propellant charges, the components (A), (B), (E) and (F) are connected in series. If controlled combustion results in a very heterogeneous system which contains both gaseous impurities and very small particles, the components (A) to (F) are preferably connected in series. For very economical working up, component (B) is used in all cases since in this way the energy formed during the combustion can be recovered and put to a sensible use.

BRIEF DESCRIPTION OF THE DRAWINGS

The apparatus according to the invention is now described in detail with reference to FIGS. 1 and 2.

FIG. 1 has a tube reactor 1 in which the flares and illumination elements are burned in a controlled manner. The tube reactor 1 is a reactor of heat-resistant steel without an internal lining. The flares and illumination elements are supplied to the tube reactor via a batchwise feed apparatus 2. Furthermore, the tube reactor is supplied with fresh air via a pipe 3 via tangential nozzles 5. The crude gas formed in the combustion is kept at above 1200° C. for at least two seconds and then fed via the pipe 7 into the heat exchanger unit 9. The hot gas heats water which is fed into the heat exchanger via pipe 8 and can be fed into the hot water or heating circulation of a heating station. The gas leaves the heat exchanger unit 9 via the pipe 11 and is fed into a multicyclone 13, where coarse particles are separated off. The coarse particles can be collected batchwise via a cellular wheel sluice 12 in storage container 14. From the multicyclone, the gas is passed into fine dust filters 15 (A, B, C, D), where fine dust particles are separated off. The fine dust filters are cleaned from time to time, deposited solids being removed via discharge screw 16 and collected in storage containers 18. From the fine dust filters 15, the pure gas is then released into the environment via the pipe 17.

FIG. 2 shows a further preferred embodiment in which alternatively a tube reactor 101 or a trough reactor 102 can be used for the controlled combustion of the pyrotechnical material. The pyrotechnical material which is to be burned can be supplied to the tube reactor 101 via a batchwise feed apparatus. When the trough reactor 102 is used, the material is supplied continuously via the hopper 104. Both reactors 101, 102 are connected to the heat exchange system 109 via pipes 107 and 108, respectively. The gas is passed into the heat exchange system as in the embodiment described in FIG. 1 and then via pipe 111 into the multicyclone 113 and from there into the fine dust filters 115 (A, B, C, D). Parts having the same function as in FIG. 1 are designated in FIG. 2 by the same reference digits, increased by the number 100. In this embodiment, the gas emerging from the fine dust filters 115 can also be subjected to wet purification. For this purpose, it is fed via connection 120 and a pipe 119 into a rotary scrubbing unit 121 and supplied from there to one or more absorption unit(s) 123 which are provided with suitable wash vessels 124. The wash vessels 124 can be worked up batchwise. For this purpose, a neutralising solution is pumped from the neutralisation vessel 126 via a pump 125 into the liquid present in the wash vessels. The neutralised solution is then released into the buffer tank 127. After the wet purification, the gas has such a small proportion of impurities that it can be released into the environment.

Figure 1:
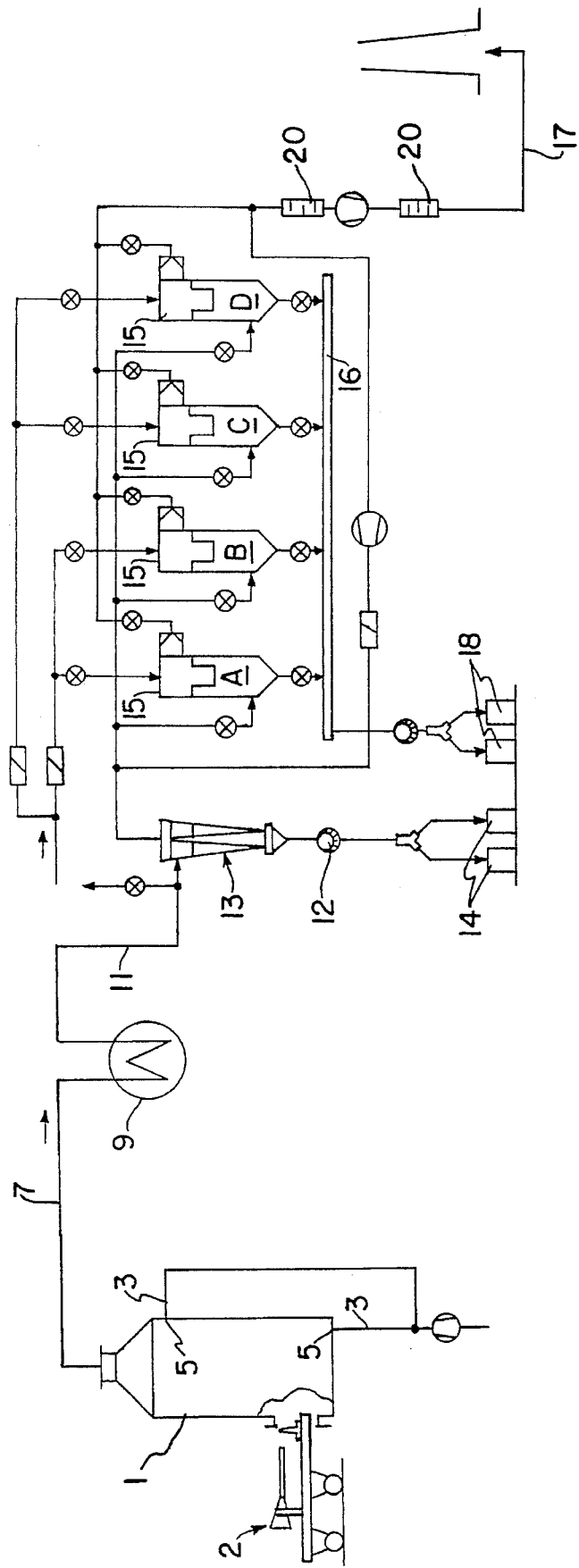
FIGS. 1 and 2 show an apparatus which is particularly suitable for working up signal and illumination pyrotechnics and a further preferred embodiment, respectively.
Figure 2:
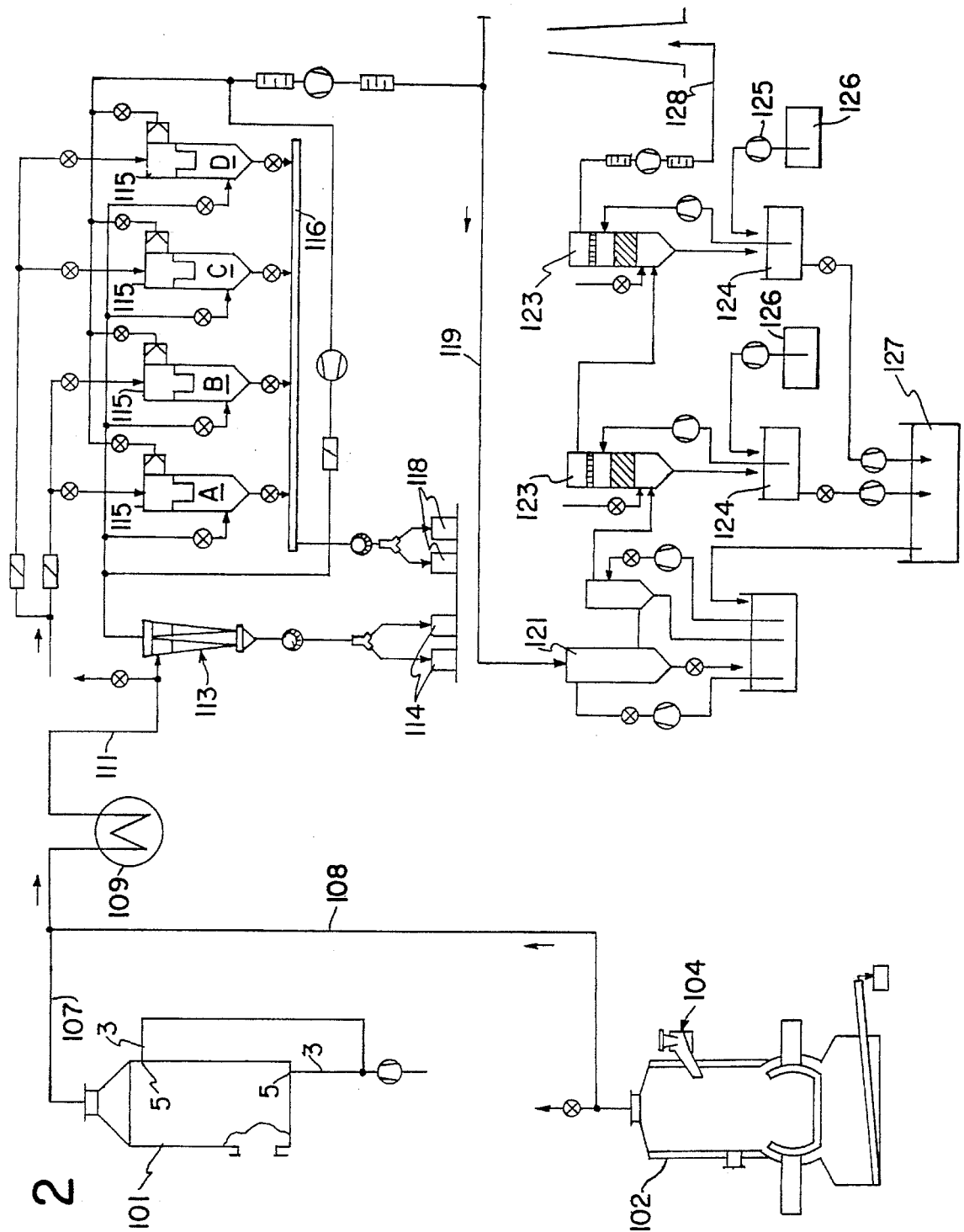

Apart from the two plants described, the individual elements of the apparatus according to the invention can be connected in series in any manner, depending on the pyrotechnical material used and on the resulting composition of the flue gas.

According to the invention, a process and an apparatus are provided in order to work up various types of pyrotechnical material safely and without pollution of the environment, valuable material and energy being recovered at the same time.

We claim:

1. A process for the environmentally safe destruction of pyrotechnic material comprising:
   (a) burning pyrotechnic material in a controlled manner in a combustion chamber to form slag and a crude gas;
   (b) passing the crude gas through a high-temperature region at a temperature of at least 1200° C. for at least two seconds;
   (c) cooling said crude gas to a temperature less than 400° C.;
   (d) purifying the crude gas by at least one of the following means:
      (i) under dry conditions by feeding said crude gas into a preliminary separator to remove coarse particles and to at least one fine dust filter to remove fine dust; and
      (ii) under wet conditions feeding the gas through a rotary scrubber and at least one adsorption zone; and
   (e) releasing the resultant purified crude gas as waste air.

2. The process of claim 1, wherein the pyrotechnic material comprises at least one of flares, illumination pyrotechnics, propellant charges, rocket propellant charges and smoke elements.

3. The process of claim 1, wherein the combustion chamber is a tubular reactor having a steel jacket, tangential nozzles and tangential plates and wherein air is passed through said tangential nozzles and via the tangential plates to cool said steel jacket.

4. The process of 1, wherein the combustion chamber and the means for treating the gas according to steps (a) to (e) are maintained under reduced pressure.

5. The process of claim 1, wherein said crude gas is heated to a maximum temperature of 2000° C. in step (b).

6. The process of claim 1, wherein the gas is cooled to a temperature below 200° C. in step (c).

7. The process of claim 1, wherein the crude gas which is supplied directly to said wet separation is cooled to a temperature below 140° C.

8. The process of claim 1, wherein a multicyclone is employed as said preliminary separator in step (d)(i).

9. The process of claim 1, wherein a Venturi scrubber is located upstream of said rotary scrubber in step (d)(ii).

10. The process of claim 1, wherein said adsorption zone is a packed column or a tray column.

11. The process of claim 1, wherein the pyrotechnic material is burned in a trough reactor having a combustion chambers and a mobile trough below the combustion chamber, said mobile trough being adapted to receive melted material and falling slag formed during step (a).

12. The process of claim 11, wherein said slag is allowed to continue burning.

13. The process of claim 12, wherein said slag is periodically removed from the mobile trough.

* * * * *